Dec. 10, 1929.     S. R. HOWARD     1,739,072
WEIGHING AND PACKAGING MACHINE
Filed April 27, 1923     13 Sheets-Sheet 4
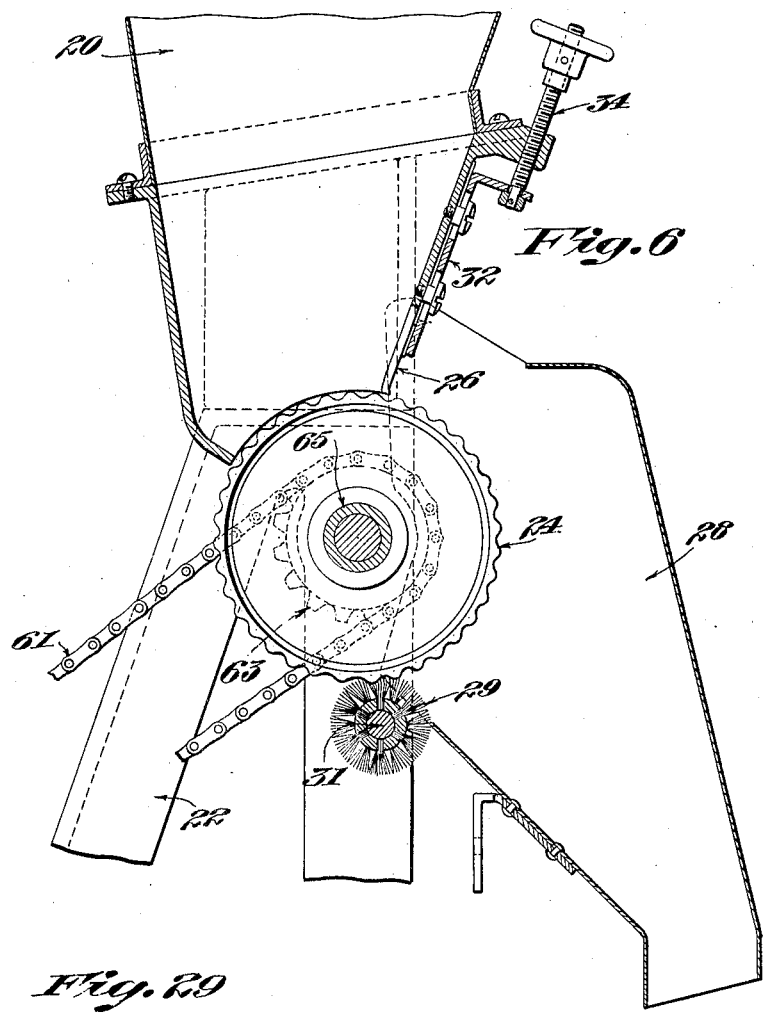
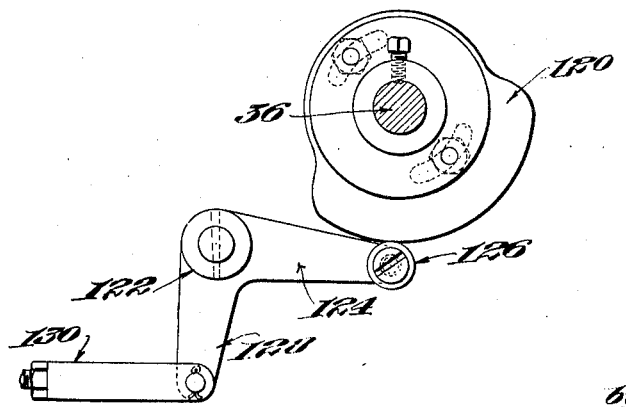
Inventor
Stanley R. Howard
by J. Stanley Churchill
Attorney Dec. 10, 1929.　　　S. R. HOWARD　　　1,739,072
WEIGHING AND PACKAGING MACHINE
Filed April 27, 1923　　13 Sheets-Sheet 5
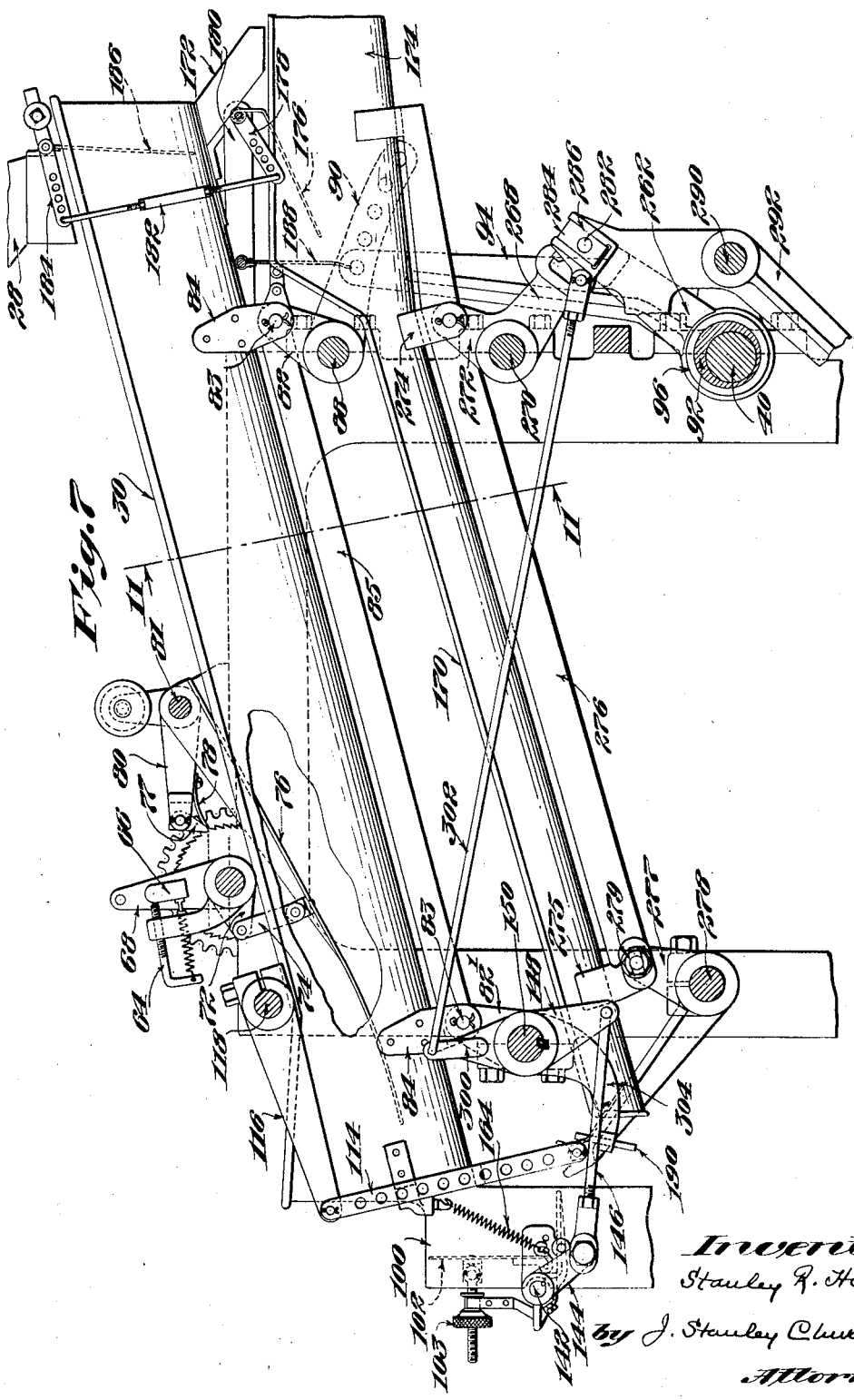

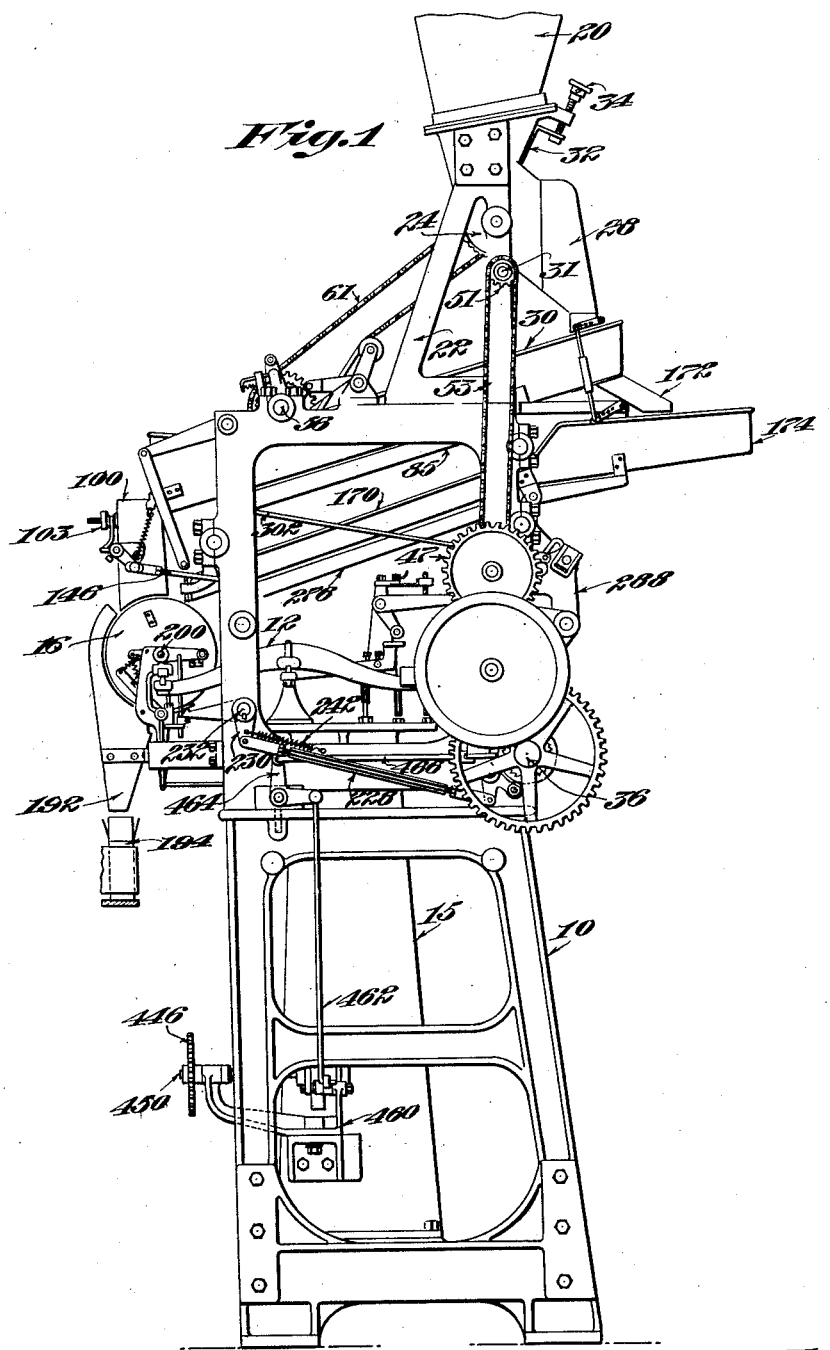

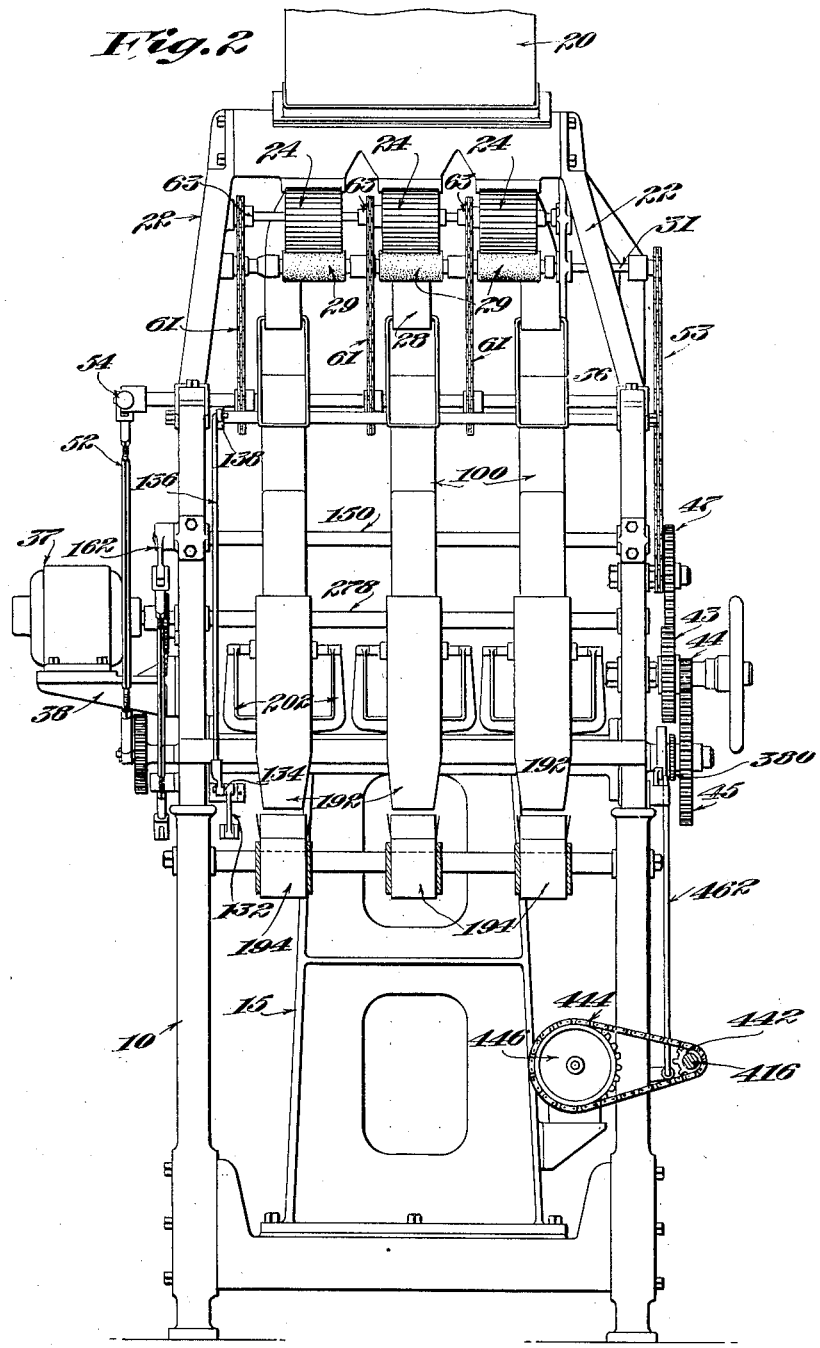

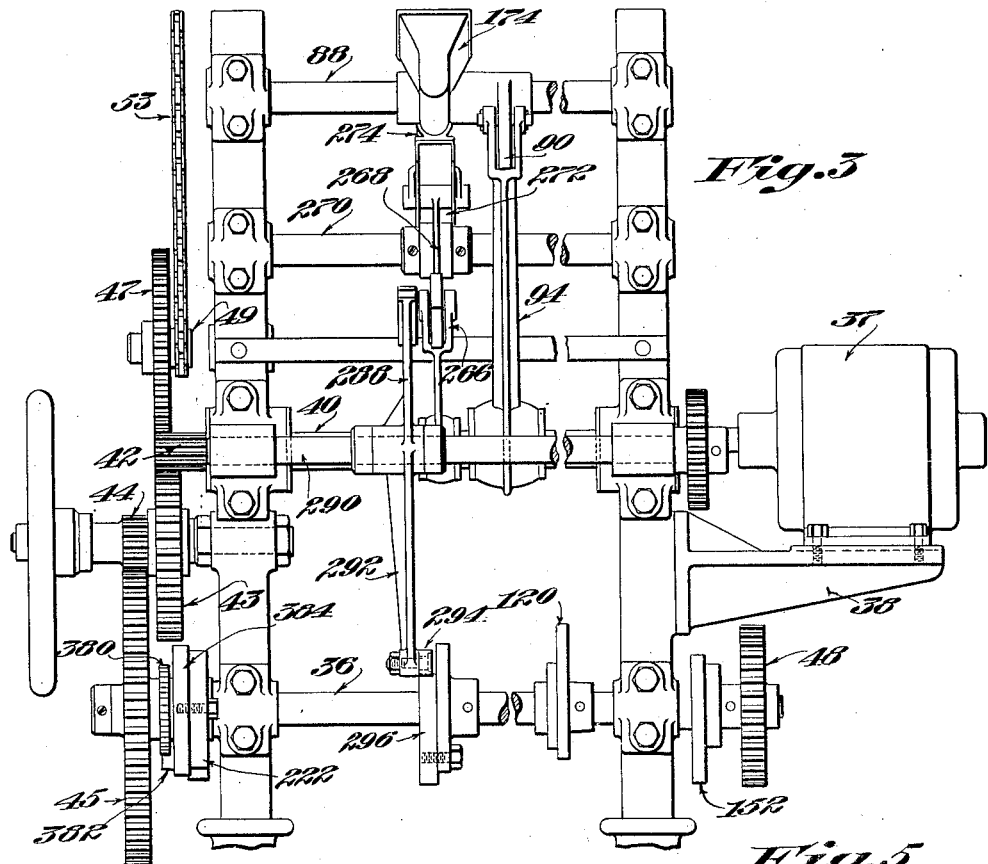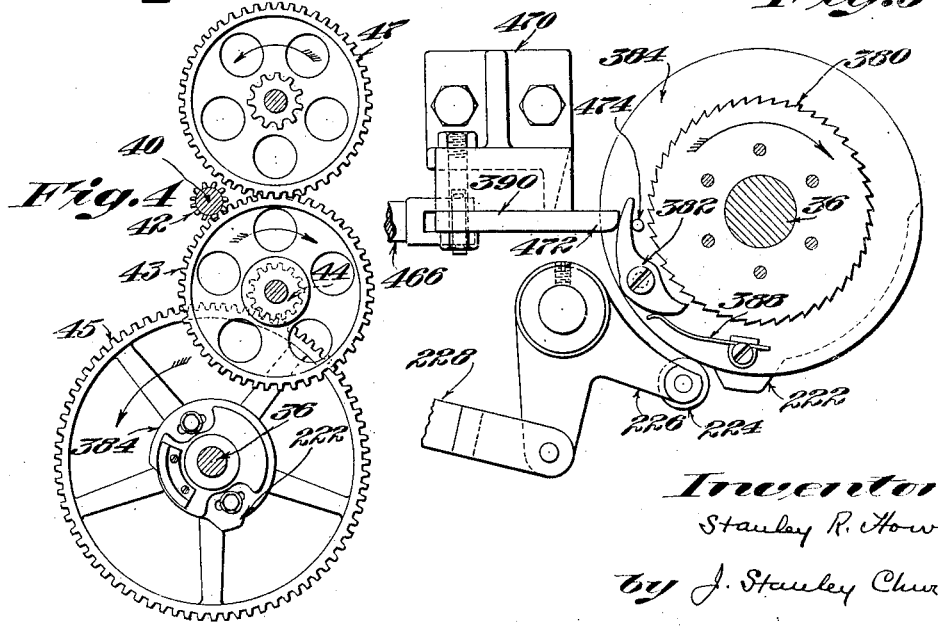

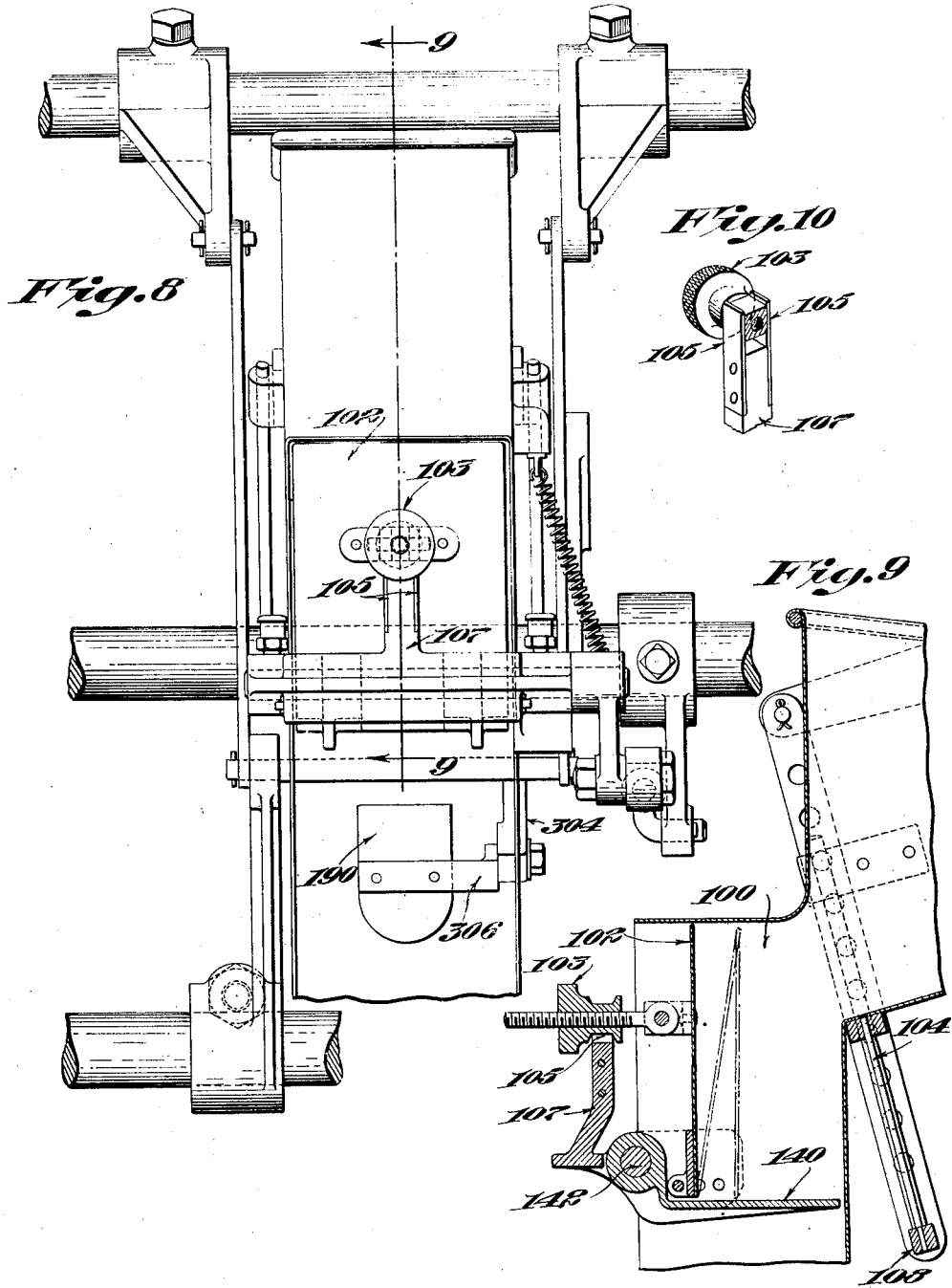

Dec. 10, 1929.  S. R. HOWARD  1,739,072
WEIGHING AND PACKAGING MACHINE
Filed April 27, 1923   13 Sheets-Sheet 7
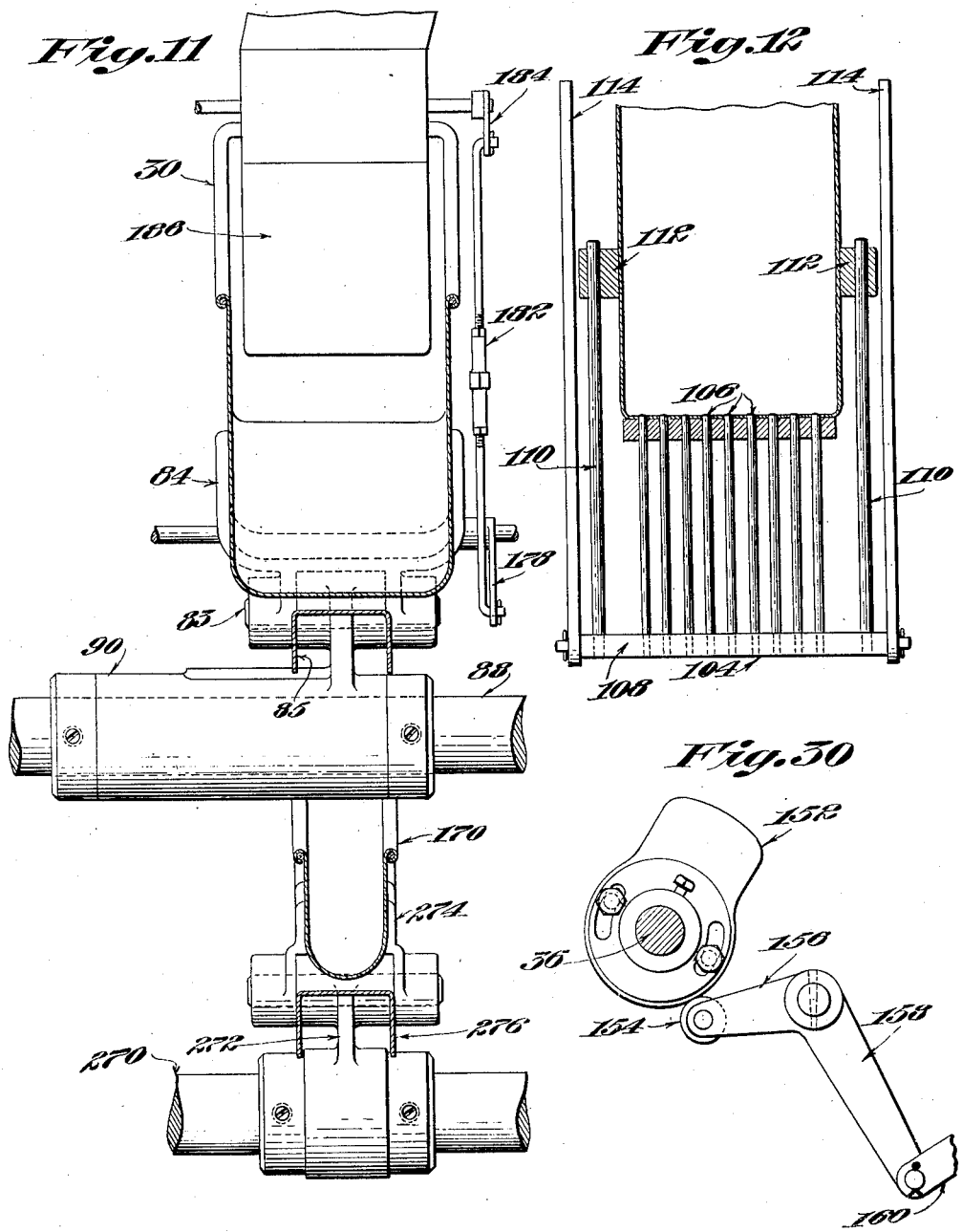

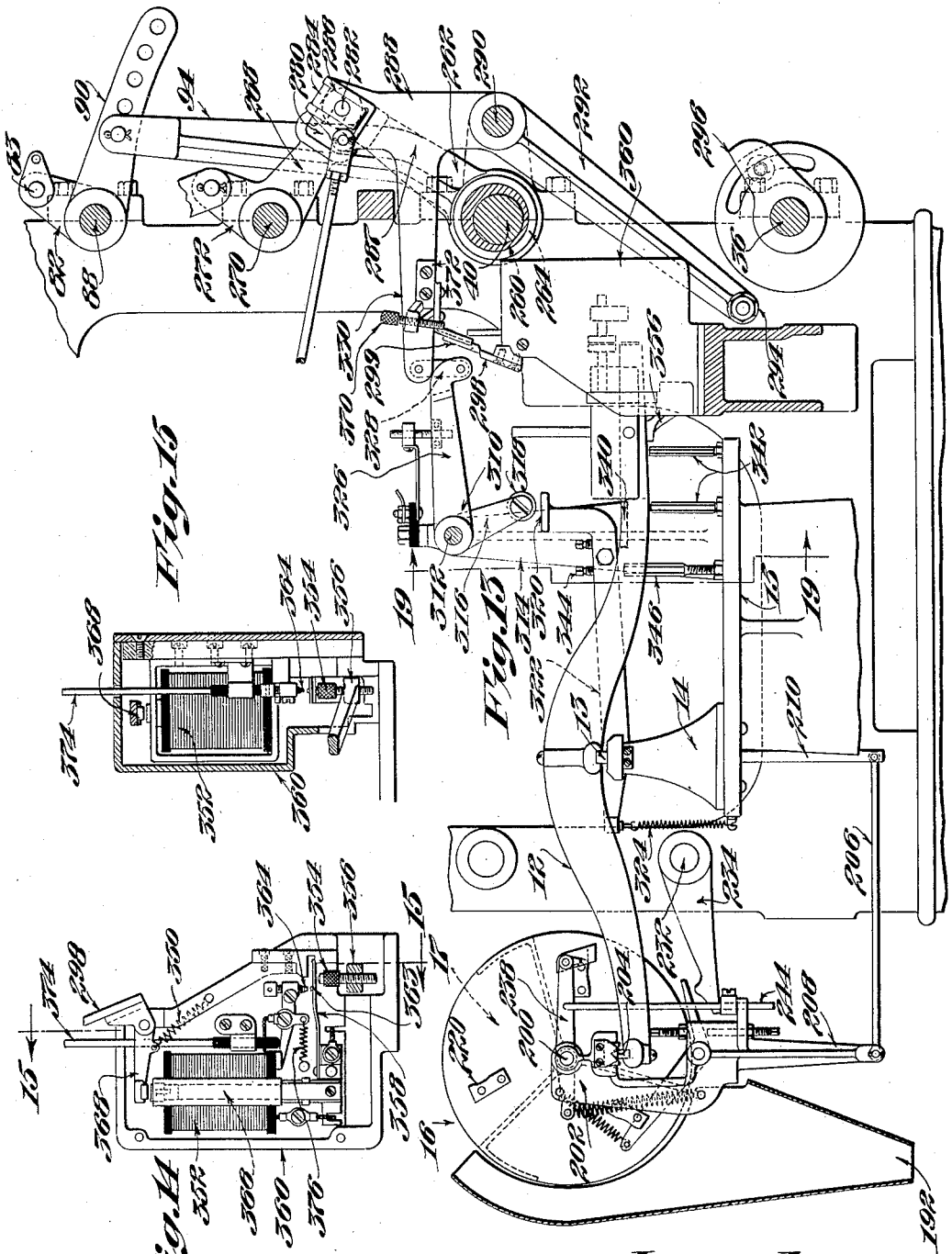

Dec. 10, 1929.　　　S. R. HOWARD　　　1,739,072
WEIGHING AND PACKAGING MACHINE
Filed April 27, 1923　　　13 Sheets-Sheet 9
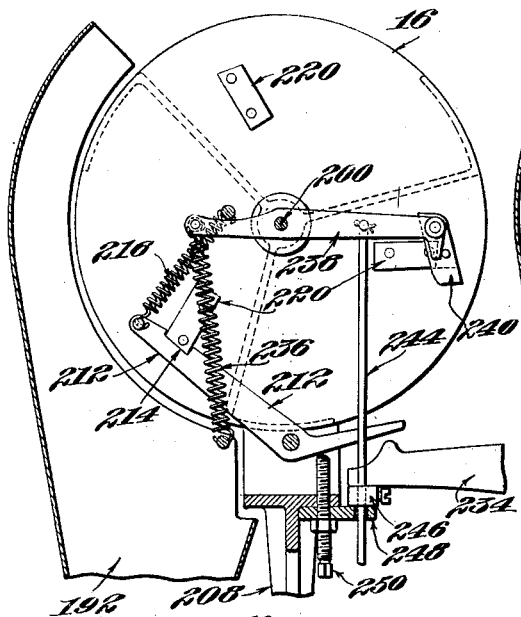

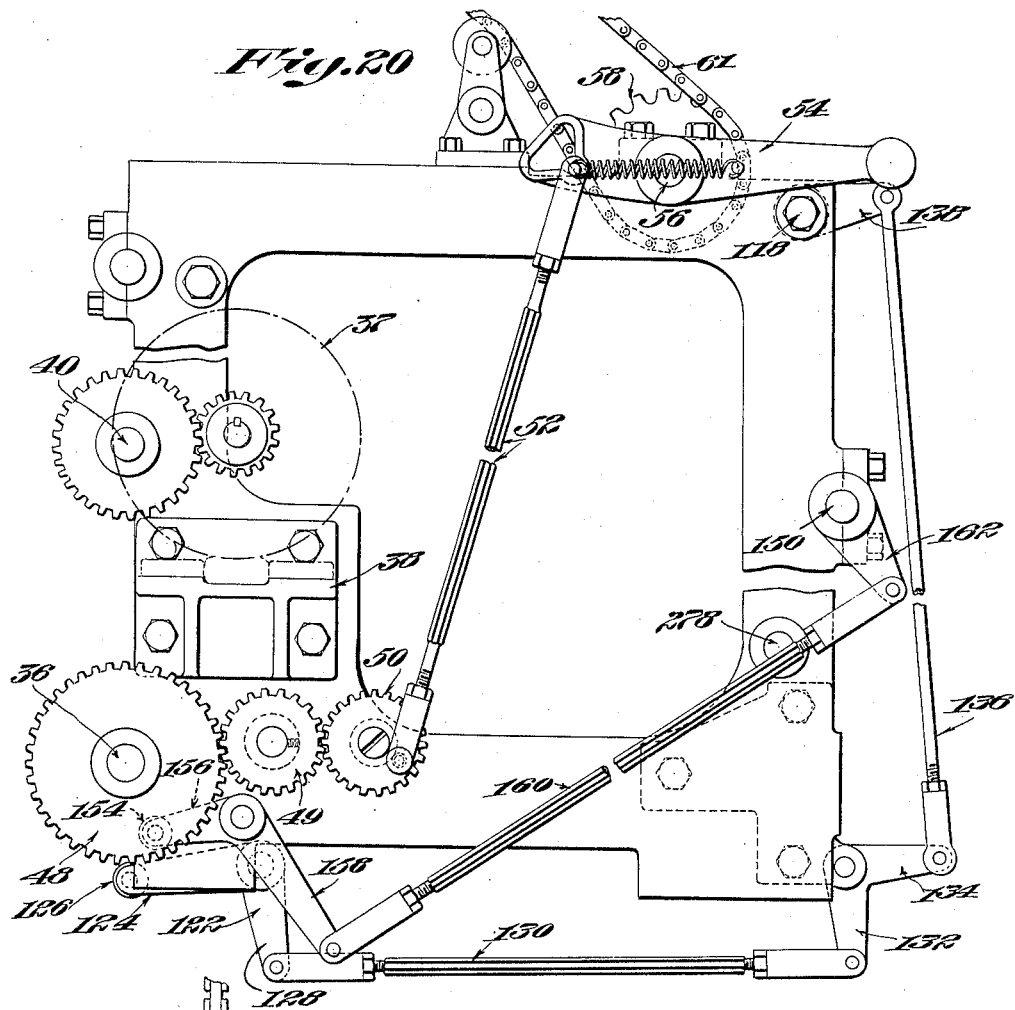

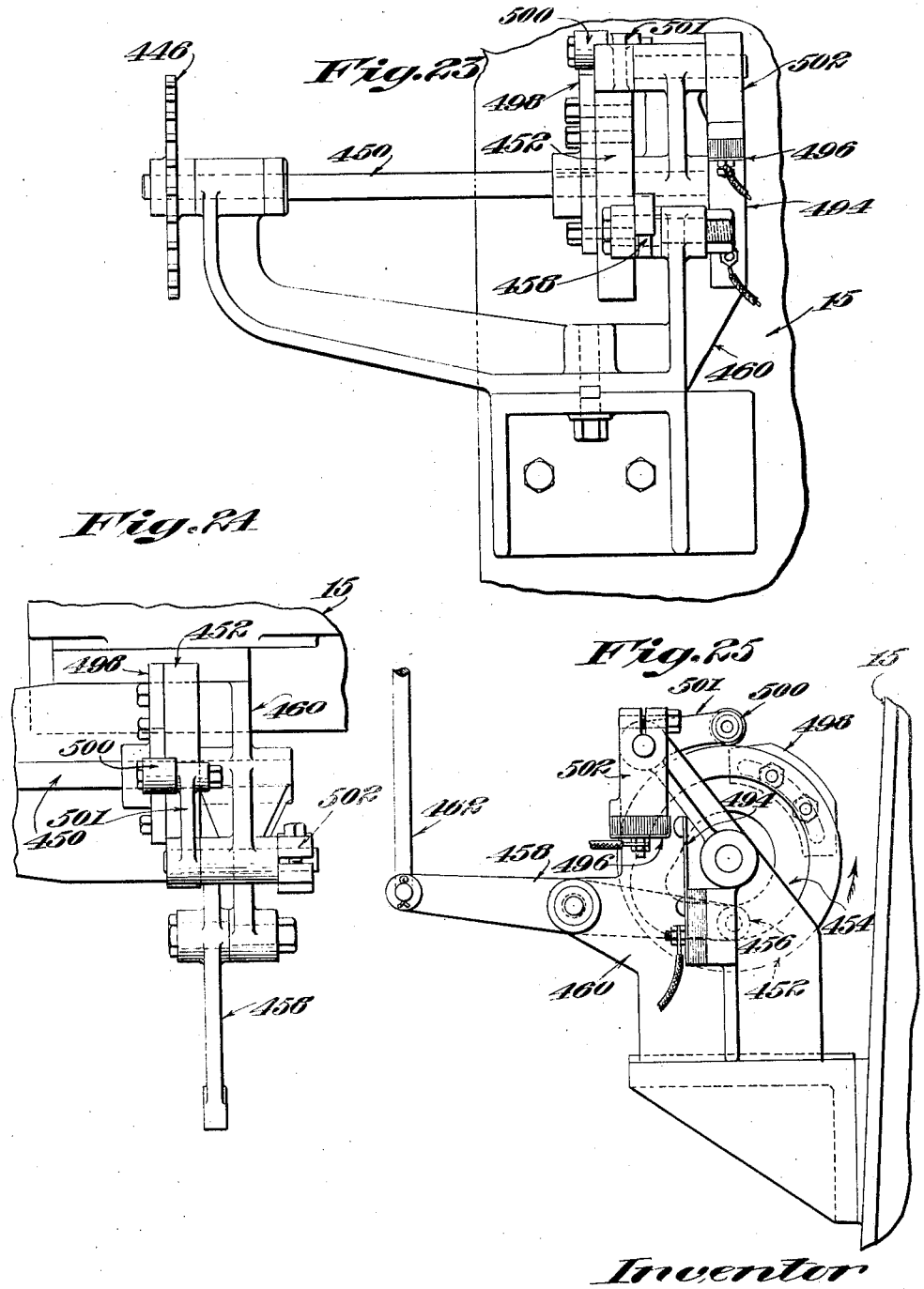

Dec. 10, 1929.   S. R. HOWARD   1,739,072
WEIGHING AND PACKAGING MACHINE
Filed April 27, 1923   13 Sheets-Sheet 12
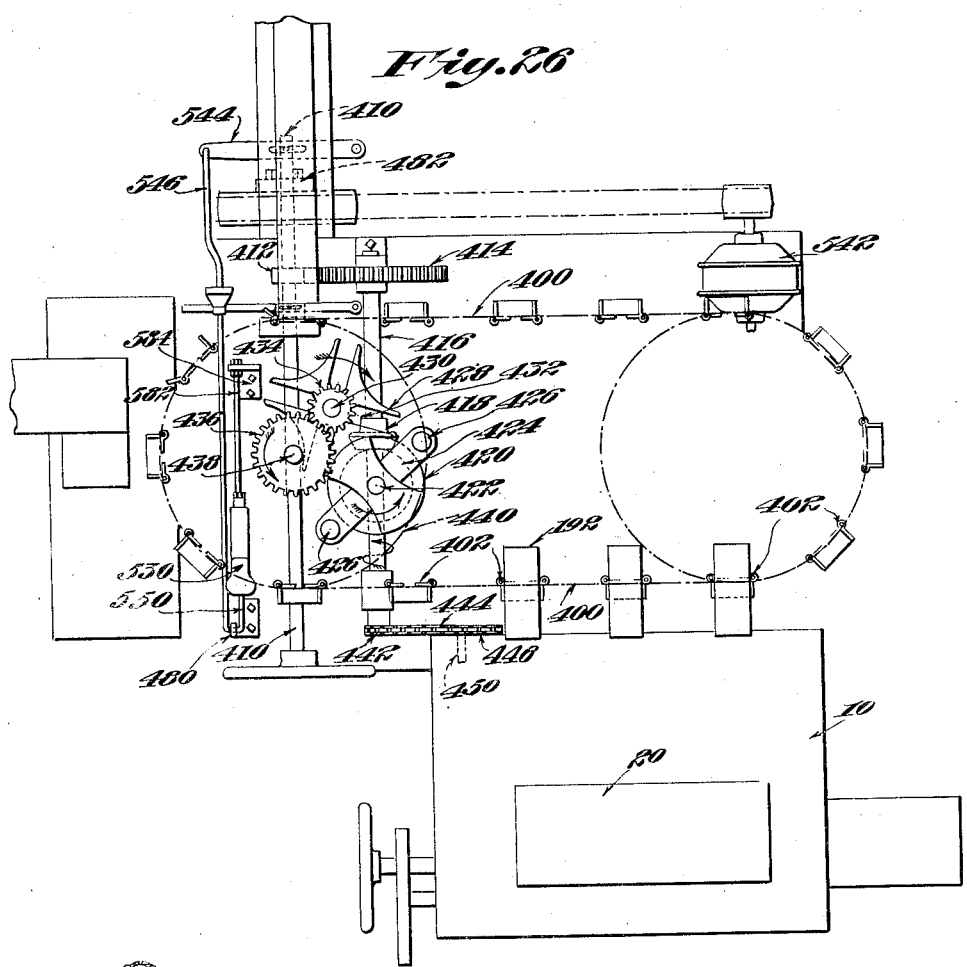
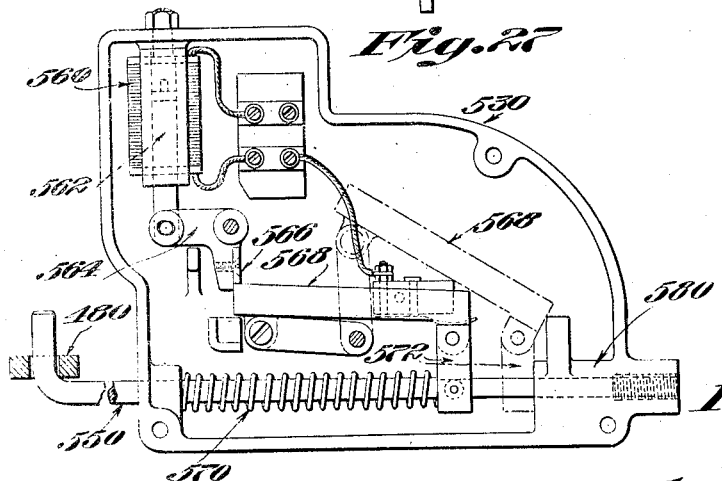
Inventor
Stanley R. Howard
by J. Hawley Churchill
Attorney

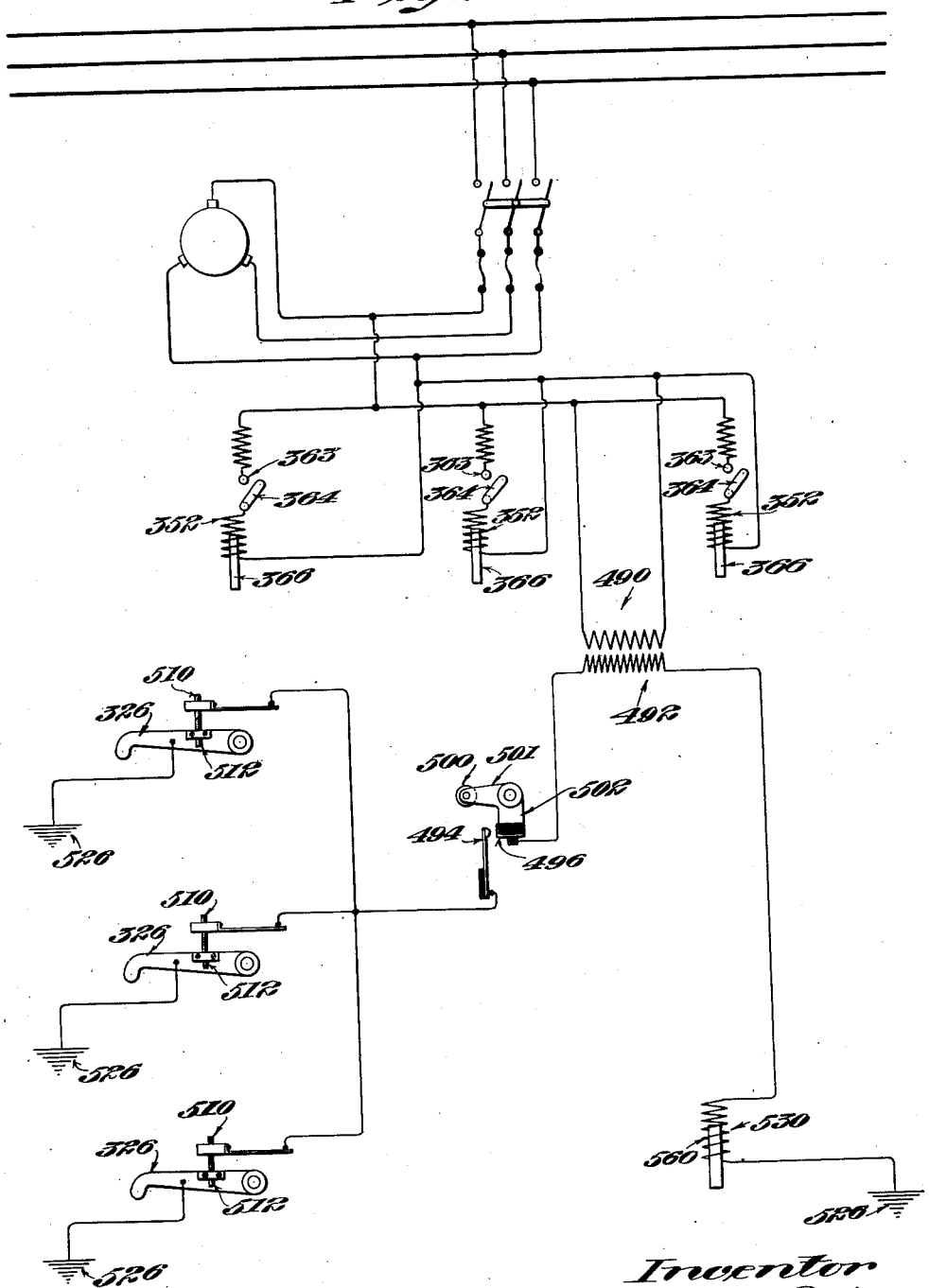

Patented Dec. 10, 1929

1,739,072

UNITED STATES PATENT OFFICE

STANLEY R. HOWARD, OF EAST MILTON, MASSACHUSETTS, ASSIGNOR TO PNEUMATIC SCALE CORPORATION, LIMITED, OF QUINCY, MASSACHUSETTS, A CORPORATION OF MASSACHUSETTS

WEIGHING AND PACKAGING MACHINE

Application filed April 27, 1923. Serial No. 635,175.

This invention relates to a weighing and packaging machine.

One object of the invention is to provide a weighing machine of novel and improved construction, capable of automatically and accurately weighing the material in a highly efficient manner and at a maximum speed.

A further object of the invention is to provide an automatic machine of novel and improved construction for accurately weighing the material and delivering it into packages.

Still further objects of the invention are to provide machines of the above mentioned character which are particularly adapted to handle, weigh and deliver accurately weighed quantities of material difficult to handle because of its tendency to become clogged and incapable of being made to flow in known ways, such, for example, as raisins, and for which prior constructions of machines are entirely unsuitable.

With these objects in view, the invention consists in the machine, and in the various structures, combinations and arrangements of parts hereinafter described and particularly pointed out in the claims at the end of this specification.

In the drawings the different features of the invention are shown as embodied in an automatic machine for automatically handling, weighing and depositing raisins into packages, and wherein Fig. 1 is a side elevation of the weighing machine; Fig. 2 is a front elevation thereof; Fig. 3 is a detail in rear elevation of the driving mechanism and the controlling mechanism for one of the units of the weighing machine; Fig. 4 is a detail in side elevation of the driving gear train; Fig. 5 is a detail in elevation of a controlling clutch to be referred to; Fig. 6 is a sectional detail of the feeding mechanism and associated parts; Fig. 7 is a detail in elevation showing the chutes for conveying the material from the supply hopper to the weighing receptacle of one unit of the weighing machine; Fig. 8 is a detail in front elevation of the mechanism shown in Fig. 7; Fig. 9 is a sectional view on line 9—9 of Fig. 8; Fig. 10 is a detail in perspective to be referred to; Fig. 11 is a sectional view on line 11—11 of Fig. 7; Fig. 12 is a detail in section showing the gate for closing the main supply chute; Fig. 13 is an elevation showing one of the scales and associated parts of one unit of the weighing machine; Fig. 14 is a view in elevation of an electrical tripping device with the cover of the enclosing casing removed; Fig. 15 is a sectional view on the line 15—15 of Fig. 14; Figs. 16 and 17 are sectional views of the weighing drum in different positions of operation; Fig. 18 is a front elevation of the same; Fig. 19 is a sectional detail on the line 19—19 of Fig. 13; Fig. 20 is a detail in elevation showing the drive for the feeding mechanism and for operating the control gate and for dumping the measured load of the material into the weighing drum; Figs. 21 and 22 are details in plan and front elevation respectively of a portion of the mechanism for feeding the material; Fig. 23 is a side elevation, Fig. 24 a plan and Fig. 25 an end elevation, of a portion of the mechanism for controlling the operation of the weighing machine; Fig. 26 is a plan showing the mechanism for automatically moving the packages; Fig. 27 is an elevation of an electrical controlling device to be referred to; Fig. 28 is a wiring diagram; Figs. 29 and 30 are details of controlling cams.

For purposes of illustration the different features of the invention have been illustrated and will be described as embodied in an automatic machine for withdrawing raisins from a bulk supply, weighing the raisins thus withdrawn into predetermined weighed amounts, and delivering the weighed raisins into successive packages presented automatically by the machine into position to receive the weighed loads of the raisins.

Referring to the drawings, 10 represents the frame of the weighing machine upon which is mounted one or more weighing units herein shown as three in number, and each comprising a scale beam 12 pivoted upon a knife edge 13 upon a pedestal 14 rising from the top of a scale supporting base 15. The scale supporting base 15 is spaced from the uprights of the main supporting frame 10, being bolted at its lower end to a cross bar of the frame 10 at a point slightly above the floor upon which the machine rests, as shown in Figs. 1 and 2. With this construction of supporting base 15, the vibration of the machine is practically eliminated from the scale, thus insuring accuracy in weighing the raisins. The scale beams 12 may be of any usual or preferred construction, having provision for mounting the necessary weights upon one end thereof. Each scale beam 12 of each of the weighing units has mounted upon its front end a weighing receptacle 16, herein shown as a rotatable drum and having a series of compartments 17 therein for the reception of the raisins to be weighed. The raisins are stored in bulk in a hopper 20, mounted at the top of the machine frame upon suitable uprights 22.

Provision is made for withdrawing the raisins from the bulk supply in the hopper 20, and as herein shown, referring particularly to Figs. 1 and 6, the raisins are fed from the hopper 20 by fluted feeding drums 24, one for each weighing unit, through discharge openings 26 in the rear side of the hopper. The feed drums 24 are intermittently rotated as will be described, and the flutes thereon operate to cause the raisins to roll in a loose condition through the discharge openings 26, whence they fall through guide chutes 28 and into the upper ends of main supply conduits or chutes 30, by which the major portion of the raisins are conveyed to the weighing receptacle 16, mounted upon the scale beams. In order to assist in controlling the flow of raisins from the hopper 20, gates 32 are slidably secured to the rear of the hopper and an adjusting screw 34 is provided, as shown in Fig. 6, for adjustably sliding the gates 32 to partially close the discharge openings 26, and thus adjust the volume of the raisin stream fed therethrough by the drum 24. The periphery of each feed drum 24 is kept clean by a rotatable brush 29, arranged to brush any raisins adhering to the drum into the guide chutes 28, as shown in Fig. 6. The brushes 29 for the plurality of weighing units are mounted upon a shaft 31, see Fig. 2, the latter being driven from the main driving shaft 40 through a pinion 42 thereon, gear 43, gear 47, sprockets 49, 51, and their connecting chain 53, as shown in Figs 2, 3 and 4.

Each feeding drum 24 is rotated by mechanism driven from a main cam shaft 36, herein shown as rotated by an electric motor 37, mounted upon a suitable bracket 38, projected from the machine frame, as shown in Fig. 3. The motor is connected directly to the driving shaft 40, journaled in suitable bearings in the machine frame, and the opposite end of the driving shaft is provided with a driving pinion 42 from which the cam shaft 36 is driven through the gear train 43, 44, 45, as shown in Figs. 3 and 4.

Referring now to Figs. 2, 7 and 20, the main cam shaft 36 is connected with the feed drums 24, through a gear 48 upon the end of the cam shaft, (see Fig. 20), an idler gear 49, and a crank gear 50, both journaled in suitable bearings upon the side of the machine frame. The crank gear 50 is connected by an adjustable link 52 to an arm 54, secured upon the outer end of a counter-shaft 56, journaled in bearings upon the top of the machine frame. The counter-shaft 56 is provided with sprockets 58, one for each weighing unit, loosely mounted thereon, and each having upon the hub 59 thereof a ratchet 60, see Figs. 21, 22. The sprockets 58 are connected by chains 61 to corresponding sprockets 63 upon the sleeves 65 upon which the feed drums 24 are mounted, see Fig. 6. The counter-shaft 56 is also provided with arms 62 secured fast thereon and having adjustable contact members 64, adapted to engage lugs 66 projecting laterally from pawl levers 68, loosely mounted upon the shaft 56, and upon which pawls 70 are pivotally secured. The pawl levers 68 constitute one arm of bell cranks, the second arms 72 of which are connected by links 74 to floats 76, preferably of aluminum, adapted to rest lightly upon the body of raisins in the main supply chute, see Fig. 7, of each weighing unit. With this construction it will be observed that as the cam shaft 56 makes one rotation the crank gear 50 makes two rotations, with the result that the counter-shaft 56 is rocked twice through a constant arc. In this manner in each weighing unit the arm 62 and contact member 64 are oscillated through a constant arc. The position, however, of the pawl lever 68 with relation to the arm 62 and contact member 64 is determined by the height of the raisins within the main supply chute, the higher the stream the more the pawl lever 68 will be swung rearwardly or to the right, viewing Fig. 7, and as a result the lug 66 carried thereby will be contacted by the contact member 64 at a later period in its arc of oscillation so that the sprocket 58 and ratchet 60 are advanced a proportionately smaller amount. On the other hand, when the raisin supply falls, the net advance imparted to the sprocket 58 proportionately increases. The advances of the ratchets 60 are retained by keeping pawls 77, held in yielding engagement with the ratchets by a spring 78. Each keeping pawl 77 is mounted upon the end of an arm 80 pivoted upon a counter-shaft 81 journaled in suitable bearings upon the top of the machine frame. The advances of the sprockets 58 are, as has been stated, transmitted to the feeding drums 24 by endless chains 61, so that during the operation of the machine the drums are rotated to an extent such as to maintain the raisins in the main supply chute 30 at a substantially uniform level. In order to successfully convey the raisins through the main supply conduits or chutes 30, it has been found desirable to arrange the latter at a gradual incline and to assist gravity in flowing the raisins by vibrating the chutes or conduits 30. In each unit of the illustrated machine, the main supply conduit or chute 30 is mounted upon arms 82, 82′, pins 83 being extended through the arms and through the lugs 84, depending from the bottom of the chute, and through a channel bar 85 which serves to maintain arms 82, 82′ in parallel relation and to cause both to vibrate in unison. The upper arm 82 is pivoted upon a counter-shaft 88, and comprises one arm of a bell crank, the second arm 90 of which projects rearwardly from the machine frame, and is provided with a plurality of holes, as shown in Fig. 7. The second arm 90 of the bell crank is connected by an eccentric 92 upon the main driving shaft 40 by an arm 94, the lower end of which is provided with a hub 96 enclosing the eccentric 92. With this construction, as the main driving shaft 40 is continuously driven from the electric motor 37, the bell crank is rocked continuously by the eccentric, operating to cause the chute 30 to vibrate vertically and forwardly at a high rate of speed. In practice I have found that the parallel arms 82 82′ should be arranged at substantially 30° to the vertical, the arc through which they are oscillated being such as to cause the raisins to assume a forward motion as well as an upward motion, which operates to throw the raisins in the air during the forward motion, and to permit the chute to return to its initial position while the raisins are in the air. The arc of oscillation of the parallel arms 82, 82′, may be adjustably regulated by connecting the end of the arm 94 to the different holes in the second arm 90 of the bell crank.

The weighing of the raisins in the weighing receptacles 16 is preferably accomplished by first depositing in each receptacle an approximate load, and thereafter dripping a relatively fine stream of raisins therein until the weight is reached. The approximate load may be conveniently secured by measuring a volume of raisins whose weight is slightly below the predetermined weight for which the scale is set, and for this purpose in each unit the raisins flowing through the main supply chute 30 are delivered into a measuring chamber 100, located at the end of the chute and in a position immediately above the weighing receptacle or drum 16. The measuring chamber 100 is preferably formed integrally with the main supply chute 30, and the front wall 102 thereof is pivotally mounted to enable the volume of the chamber to be adjusted so that the chamber when full will hold a quantity of the material slightly below the weight for which the scale beam is set. The front wall 102 is maintained in adjusted positions by an adjusting nut 103, provided with a squared portion, as shown in perspective in Fig. 10, received between spring arms 105 upstanding from a lug 107, as shown in Fig. 9. During the normal operation of the machine the raisins flow down into the measuring chamber 100 and fill it, and the end portion of the chute 30 is enlarged, as shown in Fig. 7, to prevent the raisins overflowing the same. The flow of raisins from the chute 30 into the measuring chamber 100 is cut off by a gate 104, preferably comprising a series of pins 106 arranged to form a comb, as shown in detail in Fig. 12. The pins 106 are secured at their lower ends in a cross bar 108, and the gate is guided in its movements by guide rods 110, which slide through holes in lugs 112 secured to opposite sides of the measuring chute. The gate 104 is raised and lowered in timed relation to the operation of the machine, as controlled by the main cam shaft 36 as will be described, and for this purpose the gate 104 is provided with side bars 114 connected to the ends of arms 116 upon a rock shaft 118, see Fig. 7. The rock shaft 116 is arranged to be rocked by a cam 120 mounted upon the end of the cam shaft 36, which is arranged to swing a bell crank 122, one arm 124 of which is provided with a cam roller 126 which cooperates with the cam 120, (see Fig. 20). The second arm 128 of the bell crank is connected by an adjustable link 130 to one arm 132 of a second bell crank, see Fig. 20. The second arm 134 of the second bell crank is connected by a second link 136 to an arm 138 fast upon the rock shaft 118. With this arrangement, at a predetermined time in the cycle of operations of the machine, as will be described, the shaft 118 is rocked and operates to raise the gate 104, cutting off the flow of raisins from the main supply chute 30 into the load measuring chamber 100. Provision is made for immediately thereafter dumping the measured load from the load measuring chamber into the weighing receptacle or drum 16, and for this purpose the bottom 140 of the load measuring chamber 100 is pivoted upon a shaft 142 connected by links 144, 146, to an arm 148 fast upon a second rock shaft 150, see Fig. 7. The rock shaft 150 is arranged to be rocked at the proper time to dump the measured load in the weighing drum 16 by a second cam 152 on the main cam shaft 36, and a cam roller 154 upon the end of one arm 156 of a bell crank, the second arm 158 of which is connected by an adjustable link 160 to an arm 162 fast upon the rock shaft 150. When the measured load has been thus dumped into the measuring receptacle or drum 16, the pivoted bottom 140 of the measuring chamber is returned by a spring 164, see Fig. 7, and the gate 104 holding back the flow of raisins from the main supply chute 30 into the measuring chamber 100 falls into an open position to permit a fresh measured load to accumulate in the measuring chamber.

After the measured load has been delivered into the weighing receptacle of each unit, provision is made for introducing additional quantities of the material thereto in a relatively small and uniform stream until a predetermined weight is reached. For this purpose each weighing unit is provided with a finished weight conduit hereinafter referred to as a drip chute 170 arranged below the main supply chute 30, and into the upper end of which a certain quantity of the material is by-passed from the latter through a conduit 172. The upper end of the drip chute 172 is enlarged to form a reservoir 174, in which a substantial volume of the raisins accumulates, and provision is made for regulating the amount of material by-passed from the main supply chute 30 in order to maintain the volume of raisins in the reservoir substantially uniform. For this purpose a light float 176, preferably of aluminum, is pivotally connected to an arm 178, itself pivoted upon a strap 180 projecting rearwardly from the machine frame. The arm 178 is connected by an adjustable link 182 to a second arm 184, pivoted upon the lower end of the guide chute or conduit 28, see Fig. 7. A deflecting member 186 within the main chute 30 is connected to the arm 184. With this arrangement, as the volume of the raisins increases in the reservoir 174 at the upper end of the drip chute 170, the deflecting member 186 is swung into a position to cut off the by-passing of the material from the main supply chute. When the volume of the raisins is lowered, the deflecting member 186 is swung rearwardly into a position to permit additional quantities of the raisins to by-pass, and in this manner a substantially uniform amount of material is constantly maintained in the reservoir 174 at the head of the drip chute 170. The raisins then pass downwardly from the reservoir 174 through the drip chute 170 under an evener blade 188 pivoted upon the strap 180 and by which the raisins are spread out into a substantially uniform stream. Provision is made, as will be described, for opening a gate 190 which normally closes the end of the drip chute, in order to permit the raisins to flow from the end of the drip chute into the weighing receptacle or drum 16, until a sufficient additional quantity thereof has been added to the drum to overbalance the scale, and complete the weight.

When the final weight of the raisins has been reached in each unit, provision is made for closing each drip chute 170 by the gate 190, and for immediately thereafter dumping the weighed load from each weighing receptacle or drum 16 through a discharge chute 192. As the weighed load of raisins emerges from the discharge chute 192, it may be received within a package 194, as illustrated in Fig. 2. The weighing receptacles or drums 16 are each rotatably mounted upon shafts 200, journaled in yoke members 202, see Figs. 13, 16, 17 and 18. Each yoke member 202 is hung upon knife edges 204 upon the end of the scale beam, and oscillation of each yoke upon the knife edges is controlled by a link 206, pivoted at one end to a portion 208 depending from the yoke, and at its other end to a bracket 210 upon the scale supporting base, see Fig. 13. Each weighing receptacle or drum 16 is provided with a latch member 212, having a recess 214 therein, see Figs. 16 and 17. The latch member 212 is pivoted upon the yoke 202, and is normally urged by a spring 216 in a direction such as to cause the recessed portion 214 to engage one of a series of lugs 220 projecting from the side of the drum, to thereby lock the drum from rotation during the weighing operation. In the illustrated machine the latch member 212 is arranged to be oscillated to unlock the drum at a definite time in the cycle of operation of the machine, and as shown by a cam 222 upon the main cam shaft 36, see Figs. 3 and 5. Then cam 222 actuates a cam roller 224 on one arm 226 of a bell crank arranged as shown in Fig. 1, and connected by an adjustable link 228 to a lever 230 fast upon a counter-shaft 232 journaled in and extending transversely across the front of the machine frame. At the proper time in the cycle of operation of the machine, the bell crank is swung by the cam 222 to cause a lever 234, also fast upon the shaft 232, to be swung upwardly from the position illustrated in Figs. 1 and 16, to the position illustrated in Fig. 17, and causing it to engage and lift the end of the latch member 212, thereby operating to disengage the recessed portion 214 of the latch from the lug 220. When the latch is thus disengaged, the weighing drum is rapidly and positively rotated by a kicker spring 236, connected to one end of the kicker arm 238, and which spring is arranged to be normally placed under tension while the drum is in a weighing position. The opposite end of the kicker arm 238 has pivotally mounted thereon a catch member 240, arranged to normally engage the under side of a second of a series of lugs 220 projecting from the side of the drum, so that upon release of the latch member the tension in the kicker spring 236 operates through the kicker arm 238 and catch member 240 to thrust the second lug upwardly thus rapidly rotating the drum. After the latch member has released the drum the actuating lever 230 is returned to its lower or normal position, such as is illustrated in Fig. 16, by a spring 242 attached to a lever, see Fig. 1. The latch member 212 is in this manner positioned again in the path of the approaching lug 220 upon the drum, and operates to engage the same when the latter arrives in a position to enter the recess 214. In this manner the drum is stopped from rotation automatically in a position in which the next weighing compartment is in a position to receive the load discharged from the bulk measuring chamber 100. The pivoted catch member 240 enables the lug to pass thereunder as the drum is being rotated. In order to reset the kicker arm 238 and to place the kicker spring 236 under tension, a rod 244 is arranged to depend from the kicker arm, and is provided with a collar 246 adapted to be engaged by the under surface of the actuating lever 234 when the latter is lowered. The end of the rod 244 projects through a hole in a guide plate 248 secured by an adjusting screw 250 to the under side of the yoke 202, as shown in Fig. 16. The adjusting screw 250 also serves to limit the oscillation of the latch member 212 when the latter is returned to its latching position to the end that the latching member may not be oscillated sufficiently to project into the path of the next approaching lug 220.

In order to assist in obtaining an even flow of the raisins through each of the drip chutes 170, provision is made for vibrating the drip chute and preferably only during the period when the weighing operation is being performed, as otherwise a constant vibration during the non-weighing period would cause an accumulation of a large amount of the material in the lower end of the drip chute, so that when the weighing operation was started a large drip stream would immediately flow into the weighing receptacle, defeating the efficiency of the machine and detracting from the accuracy of the weighing. Accordingly the drip chute 170 for each unit of the machine is vibrated from an eccentric 260 upon the main driving shaft 40 through a connecting arm 262, the hub 264 of which embraces the eccentric 260, as shown in Fig. 7. The upper end of the eccentric arm 262 is provided with a yoke 266, embracing the end of one arm 268 of a bell crank pivoted upon a counter-shaft 270, journaled in bearings secured to the rear of the machine frame. The second arm 272 of the bell crank is pivotally connected to lugs 274 projecting from the under side of the drip chute 170 near its upper end. The drip chute is supported upon a channel bar 276, and the lower end of the drip chute is provided with lugs 275 pivotally connected to a lever 277 loosely mounted upon the shaft 278. The end of the first arm 268 of the bell crank is provided with a triangularly shaped slot 280, and connection between the arms of the yoke 266 and the arm 268 of the bell crank is made by a pin 282, the latter being secured in the arms of the yoke and extended through the slot 280. The rear portion of the slot 280 is of a size substantially equal to the diameter of the pin to thereby connect the bell crank directly to the eccentric 260, and to transmit the vibration produced by the eccentric to the drip chute 170. The front portion of the slot 280 is of sufficient size to permit the pin 282 to move up and down in the slot without causing vibration of the drip chute.

The maintenance of a uniform stream flowing through the drip chute 170 is of importance in enabling the scale to weigh accurately, and the arrangement of the drip chute is preferably at a relatively flat angle, substantially 15° with the horizontal. As the drip chute is vibrated, an upward as well as forward motion is imparted to the raisins. This motion imparted to the raisins may be varied at the opposite end portions of the drip chute. For this purpose a slotted connection is provided between the lever 277 and the lugs 275 at the lower end of the drip chutes, and a nut 279 is provided for clamping the parts in their adjusted position, as will be apparent from an inspection of Fig. 7. With this arrangement it will be apparent that the levers 277 and the arm 272 of the bell crank may be relatively adjusted toward and from one another. By increasing and decreasing the angle of the lever 277 with the vertical, the raisins may be caused to flow faster or slower at the front end of the chute. The best results have been obtained when there is a slight retarding or diminishing action at the front or lower end of the drip chute.

In order to control the vibration of each of the drip chutes to the end that they may be vibrated during the weighing operation only, provision is made for moving the pin 282 rearwardly in the slot 280 to start vibration during the weighing operation, and for moving it again forwardly into the enlarged front end of the slot to stop vibration when the weighing operation is completed. Accordingly the pin 282 is provided upon one end thereof with an integral rectangular block 284 into which the pin is driven. The block 282 is received within a U-shaped slot 286 in the upper end of one arm 288 of a bell crank or rocker arm 287, pivoted upon a rocker shaft 290, journaled in bearings secured to the rear of the frame. The second arm 292 of the bell crank is provided with a cam roller 294 which cooperates with a cam 296 upon the main cam shaft 36 to be swung forwardly into the position illustrated in Fig. 13, at a predetermined time in the operation of the machine, as will be described. As the rocker arm is thus moved by the cam, the upper end thereof is swung rearwardly, operating through engagement of the U-shaped slot 286 with the rectangular block 284 to move the yoke pin 282 rearwardly in the triangular slot 280, and thus initiate the vibration of the drip chute 170. The vibration of the drip chute is stopped at the completion of the weighing operation, the rocker arm falling into a position in which the cam roller 294 engages the surface of the cam. During the weighing operation the rocker arm is maintained, as will be described, in the position illustrated in Fig. 13, by a trip mechanism including cooperating fingers 298, 299.

The movement of the rocker arm 287 under the influence of its cam 296 is, in the illustrated machine, utilized for the purpose of actuating the drip gate 190 to control the drip feed of the material from the drip chute of each unit at the start and close of the weighing operation, and also for unlocking and subsequently locking the scale beam, the latter being arranged to be locked during the period in the operation of the machine when the weighed load is being discharged from the weighing drum, and when the measured load is being discharged into the weighing drum 16 from the measuring chamber 100. The mechanism for opening and closing the drip gate 190 for each unit comprises an arm 300 loose upon the counter-shaft 150 and adjustably connected by a link 302 to the upper end of the rocker arm 287, as shown in Fig. 7, and a curved arm 304 secured to the arm 300 and to the end of which the drip gate 190 is secured by an arm 306, as shown in detail in Fig. 8. With this arrangement when the rocker arm 287 is swung into its position to initiate the vibration of the drip chute, the arm 300 is pulled by the link 302, causing the curved arm 304 to swing forwardly, thus opening the drip gate 190 and starting the drip feed of the material into the weighing drum 16. When the rocker arm 287 is permitted by the tripping mechanism including the fingers 298, 299, as will be described, to return to its initial position, the drip gate 190 is closed again, as will be apparent from an inspection of Fig. 7.

Referring to Figs. 13 and 19, the scale locking mechanism illustrated therein comprises a bell crank 310 pivoted upon a shaft 312, journaled in uprights 314 upon the scale supporting base. One arm 316 of the bell crank 310 is provided with a roller 318 adapted to engage a bearing surface 320 upon a lever 322 pivoted upon the scale pedestal between the arms of the yoke-shaped scale beam. The forward end of the lever 322 is yieldingly urged downwardly by a spring 324, as shown in Fig. 13, thus operating to normally elevate the bearing surface 320 and adjacent end of the lever 322 above the scale beam. The second arm 326 of the bell crank 310 is connected by a link 328 to an arm 330 projecting forwardly from the upper arm 288 of the rocker arm 287. During the weighing operation, when the scale beam is unlocked, the rocker arm 287 and the scale locking mechanism are retained in the inoperative position, shown in Fig. 13, by a pivoted finger 298 of an electrically actuated tripping mechanism, shown in detail in Figs. 14 and 15. The finger 298 engages the under side of a finger 299 depending from the under side of the arm 330. With this construction, when the pivoted finger 298 is swung forwardly permitting the rocker arm 287 to return to its normal position at the close of the weighing operation, the roller 318 is caused to engage the bearing surface 320 and to depress the lever 322. In the illustrated machine, the lever is received within the yoked portion of the scale beam, and operates to engage a steel bearing plate 340 inset in the upper surface thereof and to depress it against the bearing posts 342 in a position in which the weighing end of the scale beam and the weighing drum 16 are raised ready to receive the measured load and to start the weighing operation when again permitted so to do at the proper time in the cycle of operation of the machine.

It will be observed that the stop or bearing posts 342 against which the scale beam is depressed, are themselves mounted upon the supporting base 15 and that because of the fact that the latter is formed as a separate support from the main frame which supports the feeding and filling mechanism as well as the cams and other operating mechanism for the operation of the machine, the vibration which otherwise would be transmitted through the pins 342 directly to the scale beam is reduced to a minimum and practically eliminated.

In order to relieve the scale beam from the pressure imparted to the lever 322 by the roller 318 as the latter is forced against the bearing surface 320, a set screw 344 is set to engage a bearing post or stud 346 to limit the downward movement of the lever 322. In this manner practically all strain is taken by the bearing post 346 and screw 344. At a predetermined time in the cycle of operation of the machine the rocker arm 287 is again swung by its cam into the position illustrated in Fig. 13, its movement causing the roller 318 to be lifted from engagement with the bearing surface 320, thus unlocking the scale beam and returning the finger 299 carried by the arm 330 into a raised position in which the pivoted finger 298 of the tripper mechanism is permitted to be returned thereunder by a spring 350, see Fig. 14.

The pivoted finger 298 of the tripping mechanism is initially withdrawn from engagement with the underside of the finger 299 upon the closure of an electric circuit through an electro-magnet 352, see Fig. 14, by the engagement of an insulated contact member 354 adjustably secured in an arm 356 projecting laterally from the rear end of the scale beam, see Fig. 19, with a light spring contact 358, as shown in Fig. 14. The contact member 354 and the end of the arm 356 are arranged to extend into the interior of the casing 360 enclosing the operating parts of the electro-magnetic tripping mechanism. The circuit through the electro-magnet 352 is made between the contact points 363, 364, thus causing the plunger or armature 366 of the electro-magnet to be raised, engaging an arm 368 connected to the pivoted finger 298 and operating to oscillate the latter rearwardly, thus disengaging it from the finger 299 caried by the arm 330, and permitting the rocker arm 287 and the parts of the scale locking mechanism to fall and to lock the scale beam. As the arm 330 falls, an adjustable screw 370 carried in a bracket 372 secured to the arm, engages the upper end of a rod 374 to depress the same and to thereby rock the upper contact member 364, see Fig. 14, to break the circuit of the electro-magnet. The circuit cannot again be made by the scale until the rocker arm 287 again moves into the position illustrated in Fig. 13, permitting the rod 374 to be lifted by a spring 376, see Fig. 14. It is necessary that the spring contact 358 be light in order not to interfere with the accurate weighing by the scales. The mechanical separation of the contact member 364 operates to mechanically separate the contact points 363, 364 and to overcome their natural tendency to weld together, a condition which otherwise would interfere with the operation of the mechanism.

The cam 296 is timed to unlock the scale beam and to reset the finger 298 in position to hold the arm 330 in its raised position shown in Fig. 13, immediately after the bulk load is discharged from the measuring chamber 100 into the weighing drum 16. The cam 152 for operating the discharge of the approximate load is timed to effect the discharge immediately after the weighed load is dumped from the weighing drum.

From the description thus far, it will be observed that such unit of the weighing machine is complete in its essential details, and for some purposes a single unit weighing machine may with advantage be utilized, but for other purposes, such as increased capacity or speed it is preferred to embody a plurality of the units in a single machine. As illustrated, the weighing machine comprises three units, and the various operations of weighing and discharging the material in the manner above described are preferably arranged to take place in a single revolution of the main cam shaft 36. As illustrated, the cam shaft 36 is provided with a one revolution clutch mechanism, illustrated in detail in Fig. 5. Referring to Figs. 3 and 5, the clutch mechanism is shown as comprising a driving ratchet 380 fast upon the hub of the gear 45 of the driving gear train illustrated in Fig. 4. The gear 45 is loosely mounted upon the cam shaft 36. The ratchet 380 is normally engaged by a pawl 382 pivoted upon a plate 384 secured upon the cam shaft 36 to rotate therewith, so that during the operation of the machine, the ratchet 380 drives the cam shaft through the pawl 382. The nose of the pawl is yieldingly urged into engagement with the teeth of the ratchet by a leaf spring 388, as shown in Fig. 5. At the end of each revolution of the pawl 382, and consequently of the cam shaft 36, provision is made for oscillating the pawl to disengage it from the ratchet. As herein shown, this is accomplished by a lever arm 390 positioned in the path of the tail of the pawl.

Provision is preferably made for automatically moving empty packages into and from positions to receive the weighed load, and accordingly the lever arm 390 is preferably operatively connected, as will be described, to mechanism for moving successive packages into a position to receive the weighed load as the latter is discharged from the weighing drum 16, to the end that the positioning of the packages first takes place before the weighing machine is permitted to operate to discharge the weighed loads. In the illustrated machine the mechanism for moving the packages is shown in Fig. 26, and comprises, in general, an endless conveyor 400, preferably a chain arranged to operatively support to move therewith a plurality of package retaining members 402 cooperating to form pockets into which the empty packages may be deposited in any desired manner, as, for example, by hand. The empty packages are conveyed from a position at the left of Fig. 26 where they may be deposited in the pockets, to the proper position relative to the weighing machine, as diagrammatically illustrated in Fig. 26. After the weighing machine has operated to deposit the weighed loads in the package or packages, the filled packages are conveyed from such position by the endless conveyor, and thereafter the filled packages may be removed from the pockets at any convenient station. In the illustrated machine, the endless conveyor 400 slides in suitable guide ways or supports, not shown, and is driven from a main driving shaft 410, through spur gears 412, 414, to a countershaft 416, thence through beveled gears 418, 420, to a vertical shaft 422, carrying upon its upper end a double arm 424 having rollers 426 of a Geneva motion of ordinary construction. The driven member 428 of the Geneva motion is mounted upon a vertical counter-shaft 430, and the intermittent motion imparted thereto by the engagement of the rollers 426 with the slots 432 of the driven member 428, is imparted through cooperating gears 434, 436, to a second counter-shaft 438, to which the driving sprocket 440 for actuating the endless conveyor or chain 400 is secured. The counter-shaft 416 is provided upon its end with a sprocket 442, and a chain 444 is arranged to connect the sprocket 442 with a sprocket 446 upon the end of a counter-shaft 450, journaled in suitable bearings in a bracket 460, secured to the side of the scale supporting base, as shown in Fig. 1. The sprockets 442, 446, are of such size as to produce a reduction in speed of three to one between the speed of the counter-shaft 416 of the mechanism for moving the packages, and the counter-shaft 450 for actuating the mechanism for controlling the operation of the weighing machine through the one revolution clutch illustrated in Fig. 5 and above described. In this manner opportunity is afforded for three packages to be moved by said package moving mechanism into a position below the discharge chutes of the weighing machine, before the latter is again started on a succeeding cycle of its operation. In other words, in the illustrated machine the mechanism for moving the packages operates to move three packages into the proper position, and then the weighing machine is set in operation to deposit three previously weighed loads in the packages thus positioned and to weigh three additional loads. The weighing machine is not started upon the next cycle of its operation until three additional packages have been moved into proper position and the filled packages moved out of the way. Referring to Figs. 1, 5, 23, 24 and 25, the mechanism for controlling the operation of the weighing machine by means of the one revolution clutch mechanism illustrated in Fig. 5, comprises a cam plate 452 provided with a cam groove 454 mounted upon the counter-shaft 450. A cam roller 456 rides in the cam groove and is mounted upon one end of a lever 458 pivoted upon a bracket 460, the second end of the lever being connected by a link 462, bell crank 464, and second link 466, to a bell crank 390 pivoted upon a bracket 470 secured to the machine frame, and the second arm 472 of which cooperates with the tail of the pawl 382 of the one revolution clutch, see Figs. 1 and 5. When the high part of the cam groove 454 reaches the cam roller 456, the second arm 472 of the bell crank is swung from engagement with the tail of the pawl 382 and permits the nose of the pawl to move into engagement with the teeth of the ratchet, and thereby rotate the cam shaft 36 through an additional revolution, the ratchet driving the cam shaft through the pawl. After the pawl 382 has revolved beyond a position to be engaged by the second arm 472 of the bell crank, the cam groove 454 permits the second arm 472 of the bell crank to again move into the path of the tail of the pawl, so that when the cam shaft has made one complete revolution, the tail of the pawl is moved again against a stop pin 474 upon the cam plate, and the nose of the pawl released from engagement with the teeth of the ratchet. With this construction, therefore, it is necessary that the mechanism for moving packages continue to operate in order to restart the weighing machine at the end of each cycle of operation of the latter, and a single operator controlling the operation of such mechanism, by throwing the shipper lever 480 controlling the clutch 482 on the main driving shaft 410, see Fig. 26, may automatically start the weighing machine in operation. If, for any reason, the mechanism for moving the packages stops, then the weighing machine completes its cycle of operation and then itself stops.

In the event that any of the scales have not completed their weighing operation within the interval of time permitted by one complete revolution of the cam 454, provision is made for stopping the movement of the packages in order that the weighing machine may not deliver short weight loads into the packages. For this purpose, an electrical safety mechanism is provided, see Fig. 28, comprising a primary circuit including a primary 490 of a transformer, and a secondary circuit of low voltage including a secondary 492 of a transformer. The secondary circuit includes a pair of contacts 494, 496, adapted to be made and broken by a cam 498 and cam roll 500, upon one arm 501 of a bell crank, upon the second arm 502 of which the contact 496 is carried, see Fig. 25. The contact is arranged to be made prior to the time of the completion of a single revolution of the cam 454, or, in other words, before the completion of the single cycle of operation of the machine. Connected in parallel with said contacts 494, 496, are three pairs of additional contacts 510, 512, each pair being adapted to be closed by the second arm 326 of the bell crank 310 of the scale locking mechanism of each weighing unit when in the unlocked position illustrated in Fig. 13. The arrangement is diagrammatically illustrated in Fig. 28, and from an inspection of Fig. 28 it will be apparent that during the normal operation of the machine, in which the weighing is completed before the completion of the cycle of operation of the machine, all of the contacts 510, 512, will be broken. In the event that any one of the scales has weighed slow, so that when the cycle is completed it has not completed its weight and consequently has not operated the tripping mechanism to lock the scale, in such instance the corresponding pair of contacts 510, 512, are not broken, so that when the contacts 494, 496 are closed, a circuit is completed from a ground 526 through the contacts 510, 512, through the contacts 494, 496, the secondary of the transformer, and through a safety trip 530 controlling the operation of the mechanism for moving the packages, operating to stop the latter. In this manner the possibility of short weight being delivered into any of the packages is automatically prevented. In the illustrated machine, see Figs. 26 and 27, the main driving shaft 410 of the mechanism for moving the packages is provided with a clutch 482 of usual or preferred construction for controlling the rotation of the shaft 410 by the driving motor 542. The operation of the clutch 482 is controlled by a clutch lever 544 connected by a link 546 to the shipper lever 480. The shipper lever 480 is connected by a second link 550 to the electrically operated tripping device 350 (see Figs. 26 and 27), and as above described, when any of the scales of the weighing machine fail to complete their weight within the interval allowed, the circuit thus closed, as above described, by the cam 498 and cam roller 500 at the contact points 494, 496, see Fig. 25, energizes the electro-magnet 560 of the tripping mechanism, see Fig. 27, and operates to move the armature 562 vertically and swing a bell crank 564 to permit a latching plate 566 to release a lever 568, whereupon the coiled spring 570 previously placed under compression when the clutch was thrown in in starting the machine, moves the block 572 and rod 550 secured thereto from full to dotted line position, see Fig. 27, the lever 568 being pivoted to the block 572 assumes the position shown in dotted lines in Fig. 27. The rod 550 is connected to the shipper lever 480 below the link 546, and when thus moved by the coil spring 570 operates through the shipper lever and link 546 to disengage the clutch 482, the movement acting through the link to swing the clutch lever 544. The housing 580 for the tripping mechanism is provided with a rod 582 screwed in one end thereof, the outer end of which is supported in a bracket 584 upstanding from the base of the machine, as shown in Fig. 26. The rod 582 is loosely received within a hole in the bracket to permit sufficient play so that the shipper lever 544 may pivotally move to throw the clutch in and out. With this arrangement, therefore, when any scale fails to complete its weight, the mechanism for moving the packages is automatically stopped before the weighing machine makes its next cycle of operation. Inasmuch as the weighing machine is, in the illustrated machine, preferably started as above described by the mechanism for moving the packages, it follows that under these conditions, the weighing machine will not continue in operation after the failure of any scale to complete its weight in any given cycle of the operation of the weighing machine. To restart the entire machine the operator must start the mechanism for moving the packages by throwing the shipper lever 480 to throw in the clutch, thus resetting the safety tripping mechanism 530.

The operation of the illustrated machine will be apparent from the above description of the different features thereof, and briefly is as follows:

When the package moving mechanism illustrated in Fig. 26 has operated to present three packages to beneath the discharge chutes of the weighing machine, the one revolution clutch is automatically thrown in, starting the weighing machine in operation. The first step in the cycle of operation of the weighing machine is the dumping of the previously weighed loads from the weighing receptacles or drums 16 into the packages. As soon as the weighing drums have rotated to present the next empty compartments thereof, the pivoted bottoms 140 of the measuring chambers 100 open, depositing the approximate loads in the weighing receptacles. Immediately thereafter the rocker arms 287 are moved by their cams to start the drip streams, to unlock the scale beams, and to vibrate the drip chutes. At substantially the same time, the pivoted bottoms 140 of the measuring chambers 100 are returned to their closed positions and the gates 104 opened to permit fresh approximate loads to flow from the main supply chutes into the measuring chambers 100. After the measuring chambers have been refilled, the gates 104 are closed and the weighing operation continues until sufficient material has been dripped into the weighing drums of each unit to trip the scale. When each scale falls it closes an electrical contact at the contacts 363, 364, oscillating the pivotal fingers 298 and permitting the rocker arms 287 to fall, simultaneously cutting off the drip streams, stopping vibration of the drip chutes, and locking the scales. The one revolution clutch is then automatically thrown out, thus stopping the machine until it is restarted again by the presentation of three additional packages to filling position.

It will be observed that the major portion of the cycle of operation of the machine is devoted to the weighing operation itself, thus affording sufficient time for accurate weighing and at the same time enabling the machine to operate at maximum speed. During the weighing operation the next approximate load is being accumulated in readiness to be deposited upon the scale at the beginning of the next cycle.

It will also be observed that the handling and the feeding of material such as raisins upon the scale is, in the illustrated machine, accomplished in such manner as to overcome the natural tendency of such material to become damaged or to become pressed into a mass to clog or plug up the machine.

While in their preferred form certain features of the invention are embodied in a multiple unit weighing machine, it is not desired to limit the invention to a machine including a plurality of units; and it is to be also understood that while in its illustrated form the different features of the invention have been embodied in a machine for automatically handling, weighing and delivering raisins, the different features may be embodied in machines for operating upon other materials within the scope of the following claims.

Having thus described the invention, what is claimed is:

1. In a weighing machine, in combination, a scale, a supporting base for the scale, mechanism for feeding material to be weighed on to the scale, mechanism for discharging the weighed material from the scale, and a frame for supporting said feeding and discharging mechanism separate and spaced from said scale supporting base at the scale supporting end of the latter and for a sufficient part of the length thereof to eliminate vibration from the scale.

2. In a weighing machine, in combination, a scale, a supporting base for the scale, mechanism for feeding the material to be weighed on to the scale including a conduit and means for vibrating it to assist in flowing the material therethrough, mechanism for discharging the weighed material from the scale, and a frame for supporting said feeding and discharging mechanisms separate and spaced from said scale supporting base at the upper end of the latter and for a sufficient part of the length thereof to eliminate vibration from the scale.

3. In a weighing machine, in combination, a hopper for containing the material to be weighed, a scale, and a mechanical feeding mechanism for moving and withdrawing the material from the hopper including a movable feeding device and means for variably moving the feeding device in accordance with the level of material previously fed.

4. In a weighing machine, in combination, a scale, means for conveying the material on to the scale including a rotatable feed drum, and means variably controlled by the material supplied on to the scale for rotating the feed drum.

5. In a weighing machine, in combination, a hopper for containing the material to be weighed, a scale, and means for conveying the material from the hopper on to the scale to be weighed thereby, including a feeding device, a main supply conduit, a finished weight conduit, and means controlling the operation of the feeding device for actuating the feeding device and means for maintaining a substantially uniform supply of the material in one portion of said main supply conduit.

6. In a weighing machine, in combination, a hopper for containing the material to be weighed, a scale, means for conveying the material from the hopper on to the scale to be weighed thereby including a feeding member, a main supply conduit, a finished weight conduit cooperating with the main supply conduit to be supplied with material therefrom, and means for operating the feed mechanism in accordance with the level of the material in said main supply conduit, said means including a ratchet connected with the feed member, a float adapted to be raised and lowered by the material in the main supply conduit, a pawl, and connections between the pawl and float for advancing the ratchet in proportion to the level of the material in the main supply conduit.

7. In a weighing machine, in combination, a hopper for containing the material to be weighed, a scale, means for conveying the material from the hopper on to the scale to be weighed thereby including a fluted feed drum, a main supply conduit, a finished weight conduit cooperating with the main supply conduit to be supplied with material therefrom, and means for rotating the feed drum in inverse proportion to the amount of the material in said main supply conduit, said means including a driven member connected to the feed drum, a float in one of said conduits, and a driving member connected to the float for actuating the driven member in inverse proportion to the amount of the material in one portion of said conduit.

8. The combination, with a measuring chamber for measuring a definite volume of material, of a conduit for delivering material thereto, means for cutting off the flow of material from the conduit into the measuring chamber and means for vibrating the conduit, said measuring chamber having provision for automatically discharging the measured material therefrom.

9. The combination, with a measuring chamber, of a conduit for conducting material into the chamber, means for cutting off the flow of material from the conduit into the measuring chamber and means for vibrating both the chamber and the conduit, said measuring chamber having provision for automatically discharging the measured material therefrom.

10. The combination, with measuring means for measuring a definite volume of material, of movably mounted means for delivering material therein, means for cutting off the flow of material from the conduit into the measuring chamber and means for oscillating one of said means, said measuring means having provision for automatically discharging the measured material therefrom.

11. In a machine of the character described, in combination a conduit, of means for delivering material therein, including a mechanical feeding device and actuating means therefor constructed and arranged to actuate the feeding device in response to variations in the amount of material flowing through the conduit.

12. In a weighing machine, in combination, a scale, means for delivering the material to be weighed upon the scale, including a conduit, and means acting upon the material as it flows through the conduit for evening the same and means for assisting it in its flow through the conduit.

13. In a weighing machine, in combination, a scale, a hopper for containing the material to be weighed, and means for delivering the material from the hopper on to the scale including a main supply conduit, a finished weight conduit, and means controlled by the material in the finished weight conduit for supplying material from the main supply conduit into the finished weight conduit.

14. In a weighing machine, in combination, a hopper for containing a bulk supply of the material to be weighed, a scale, a main supply conduit leading from below the hopper to above the scale, and a rotatable feed drum arranged to withdraw the material from the bottom of the hopper and to permit it to fall into the upper end of said conduit in a loose and separated condition, and a conduit fed from said main supply conduit for supplying additional material to the scale to complete the weight.

15. In a weighing machine, in combination, a scale, a main supply conduit, a measuring chamber mounted upon the end of the main supply conduit, and means for vibrating the main supply conduit and measuring chamber.

16. In a weighing machine, in combination, a scale, a rotatable weighing chamber mounted on the scale, means for delivering material to be weighed into the chamber until a load of predetermined weight is reached, a locking device for holding the chamber from rotation, positively timed means for unlocking said device to permit rotation of the chamber, and means for automatically rotating the chamber to discharge said weighed load.

17. In a weighing machine, in combination, a scale, a rotatable weighing chamber provided with a plurality of compartments mounted upon the scale, means for delivering the material to be weighed into one of the compartments until a load of a predetermined weight is reached, a locking device for holding the chamber from rotation, positively timed means for unlocking said device to permit rotation of the chamber, and means for automatically rotating the chamber to discharge said weighed load, and to present an empty compartment into weighing position.

18. In a weighing machine, in combination, a scale, a rotatable weighing chamber mounted thereon, means for delivering the material to be weighed into the chamber until a load of a predetermined weight is reached, a locking device for holding the chamber from rotation, positively timed means for unlocking said device to permit rotation of the chamber, and means for positively rotating the chamber to discharge said weighed load.

19. In a weighing machine, in combination, a scale, a rotatable weighing chamber mounted thereon, means for delivering the material to be weighed into the chamber until a load of a predetermined weight is reached, and means for positively rotating the chamber to discharge said weighed load comprising a lever, a spring, and a cam controlled latch for normally holding the chamber in a locked position with said spring under tension, and means for releasing the latch to permit the chamber to be rotated by the spring.

20. In a weighing machine, in combination, a scale, a rotatable weighing chamber mounted thereon, means for delivering the material to be weighed into the chamber until a load of predetermined weight is reached, and means for rotating the chamber to discharge said weighed load comprising a lever, a spring connected to the lever, a plurality of lugs upon the chamber with which said lever is adapted to cooperate successively to rotate the chamber, and a latch adapted to cooperate with said lugs to normally lock the chamber and means for releasing the latch to unlock the chamber constructed and arranged to permit the rotation of the same when released.

21. In a weighing machine, in combination, a scale, a rotatable weighing drum mounted thereon, means for delivering the material to be weighed into the drum until a load of a predetermined weight is reached, means for rotating the drum to discharge said weighed load comprising a lever, a spring connected to the lever, a plurality of lugs upon the drum with which said lever is adapted to cooperate successively to rotate the drum, a latch adapted to cooperate with said lugs to normally lock the drum in rotation, and cam actuated means for releasing the latch.

22. In a weighing machine, in combination, a scale, a conduit for delivering material upon the scale, means for pivotally supporting the conduit at different points, means for oscillating the conduit to produce vibration thereof, and means for adjusting the pivotal support at one of the points to vary the extent of oscillation at such point.

23. In a weighing machine, in combination, a scale, and means for delivering the material to be weighed upon the scale, including means for depositing an approximate load upon the scale, a finished weight conduit, means for pivotally supporting the finished weight conduit at different points, means for oscillating said conduit to produce vibration thereof, and means for adjusting one of said pivotal supports to produce different angles of vibration at different parts of said conduit.

24. In a weighing machine, in combination, a scale and means for delivering the material to be weighed upon the scale, including means for depositing an approximate load upon the scale, a finished weight conduit, means for vibrating said conduit, and means for varying the effect of the vibration at different points in the conduit.

25. In a weighing machine, in combination, a scale, means for delivering an approximate load upon the scale, a separate conduit for supplying additional material to the scale to weigh the final load, a gate for cutting off the flow of material from the conduit, means for opening the gate including a pivoted arm, a positively driven cam, a cam lever, and connections between the arm and cam lever.

26. In a weighing machine, in combination, a scale, means for depositing an approximate load upon the scale, a conduit mounted to be capable of oscillation, means for oscillating it to produce vibration thereof, cam actuated means for starting, and scale actuated means for stopping said vibration.

27. In a weighing machine, in combination, a scale, means for depositing an approximate load upon the scale, a finished weight conduit mounted to be capable of oscillation, means for oscillating it to produce vibration thereof, and means for stopping and starting said vibration at the start and end of the weighing operation, including a positively oscillated member, a pin carried by said member, a lever connected with the finished weight conduit provided with a slot having an enlarged portion and in which said pin is received, and cam actuated means for moving the pin in said slot to cause in one position the vibration of the pin to be transmitted to the finished weight conduit, and in another position to permit the pin to idly vibrate in the slot.

28. In a weighing machine, in combination, a scale, means for depositing an approximate load upon the scale, a finished weight conduit mounted to be capable of oscillation, means for oscillating it to produce vibration thereof, a driven member, an arm connected therewith, and connections between the arm and finished weight conduit having provision for lost motion to permit selective vibration of the conduit during a certain period in the operation of the machine.

29. In a weighing machine, in combination, a scale, means for depositing an approximate load upon the scale, a finished weight conduit, means for controlling the flow of material from the conduit, and means operatively connected with said controlling means for starting the finished weight flow and for vibrating the conduit.

30. In a weighing machine, in combination, a scale, means for depositing an approximate load upon the scale, a finished weight conduit, means for controlling the flow of material from said conduit, means for vibrating the conduit, and means cooperating with both of said means for starting the flow of material from the conduit and starting the vibration of the conduit.

31. In a weighing machine, in combination, a scale, means for depositing an approximate load upon the scale, a finished weight conduit, means for controlling the flow of material from the conduit, means for vibrating the conduit, and a cam actuated member connected with both of said means for starting both the finished weight flow and vibration of the conduit.

32. In a weighing machine, in combination, a scale, means for delivering an approximate load upon the scale, a conduit for supplying additional material to the scale to weigh the final load, a gate for cutting off the flow of material from said conduit, means for opening the gate including a pivoted arm, a cam, a cam lever, and connections between the arm and cam lever, means for vibrating the conduit, and means actuated by the movement of said cam lever in opening the drip gate for starting the vibration of the conduit.

33. In a weighing machine, in combination, a scale, means for delivering an approximate load upon the scale, a conduit for supplying additional material to the scale to weigh the final load, a gate for cutting off the flow of material from the conduit, means for opening the gate including a pivoted arm, a cam, a cam lever, and connections between the arm and cam lever, means for vibrating the conduit, and means actuated by the movement of said cam lever whereby said gate is opened and closed, for starting and stopping the vibration of the conduit.

34. In a weighing machine, in combination, a scale, means for delivering an approximate load upon the scale, a conduit for supplying additional material to the scale to weigh the final load, means for controlling the flow of material through the conduit, means for vibrating the conduit, and means for operating both of said means to start and stop the flow of material through and the vibration of the conduit, including a cam, a cam lever adapted to be moved into an operative position to start the flow and to start vibration of the conduit, and means for holding the cam lever in such position until the weight is made and for thereafter releasing the cam lever to permit its return to stop the flow and stop the vibration of the conduit.

35. In a weighing machine, in combination, a scale, means for delivering an approximate load upon the scale, a conduit for supplying additional material to the scale to weigh the final load, means for controlling the flow of material through the conduit, means for vibrating the conduit, and means for operating both of said means to start and stop the finished weight flow and the vibration of the conduit, including a cam, a cam lever adapted to be moved into an operative position to start the flow and to start vibration of the conduit, and an electrically operated mechanism for holding the cam lever in such position until the weight is made and for thereafter releasing the cam lever to permit its return to stop the flow and stop the vibration of the conduit.

36. In a weighing machine, in combination, a scale, means for delivering an approximate load upon the scale, a conduit for supplying additional material to the scale to weigh the final load, means for controlling the flow of material through said conduit, means for vibrating the conduit, and means for operating both of said means to start and stop the finished weight flow and the vibration of the conduit, including a cam, a cam lever adapted to be moved into an operative position to start the drip flow into and to start vibration of the conduit, and an electrically operated mechanism for holding the cam lever in such position comprising a latching member, a spring for holding the member in operative position, an electro-magnet, movable contact members controlling said electro-magnet, and means carried by the scale for relatively moving said contact members to close the circuit to operate the electro-magnet and oscillate the latching member when the weight is made.

37. In a weighing machine, in combination, a scale, means for delivering an approximate load on to the scale, a finished weight conduit for supplying additional material to the scale, cam operating means for starting the flow of material therethrough, means for intermittently vibrating the finished weight conduit, and means controlled by said cam operated means for starting and stopping the vibration of the finished weight conduit substantially simultaneously with the starting and stopping of the flow of material through the finished weight conduit.

38. In a weighing machine, in combination, a scale, means for delivering an approximate load upon the scale, a finished weight conduit for supplying additional material to complete the weight, means for locking the scale when the weight is made, and cam operated means for operating the scale locking means and for starting the vibration of the finished weight conduit.

39. In a weighing machine, in combination, a scale, means for delivering an approximate load upon the scale, a finished weight conduit for supplying additional material to complete the weight, means for locking the scale, means for controlling said scale locking means to unlock the scale and to maintain it in such position until the weight is reached, and means for vibrating the drip conduit.

40. In a machine of the character described, in combination, a scale, means for delivering an approximate load upon the scale, a finished weight conduit for supplying additional material to complete the weight, means for locking the scale, means for controlling said scale locking means to unlock the scale and to maintain it in such position until the weight is reached, means for vibrating the finished weight conduit, and connections between said vibrating means and the means for controlling the scale locking means to stop the vibration when the weight is reached.

41. In a weighing machine, in combination, a scale, means for depositing an approximate load upon the scale, a finished weight conduit, means for unlocking the scale, means for starting the finished weight stream, and means for vibrating said conduit, all controlled by a single cam, and means actuated by the scale when the weight is made for locking the scale, stopping the vibration of said conduit and cutting off the finished weight stream.

42. In a weighing machine, in combination, a scale, means for depositing the material to be weighed upon the scale, including a finished weight conduit, means for vibrating said conduit, a cam actuated member for starting the vibration of the conduit, and means cooperating with said member for retaining it in a position to continue the vibration until the weight is made and for then releasing it to stop the vibration, said means including an electro-magnet, contact members comprising a pivoted arm and a light spring, means carried by the scale for moving the light spring into contact with the arm to energize the electro-magnet and release the cam actuated member, and means actuated by movement of said cam actuated member for rocking the pivoted arm to break the circuit through the electro-magnet.

43. In a weighing machine, in combination, a plurality of weighing units each including a scale, means for depositing the material to be weighed upon the scale, means for discharging the weighed material therefrom, a one revolution clutch, and means connected therewith for controlling the operation of all of the units.

44. In a machine of the character described, in combination, a plurality of weighing units each including a scale, means for depositing the material to be weighed upon the scale, means for discharging the weighed material therefrom, means for moving successive packages into a position to receive the weighed loads, and a one revolution clutch controlling the operation of all of the weighing units and operatively connected with said package moving means to be itself controlled thereby.

45. In a machine of the character described, in combination, a plurality of weighing units each including a scale, means for depositing the material to be weighed upon the scale, means for discharging the weighed material therefrom, means for moving a plurality of packages into a position to receive the weighed loads, a one revolution clutch controlling the operation of all of the weighing units, and connections between the clutch and package moving means arranged to restart the operation of the weighing units when one package for each weighing unit has been moved into position.

46. In a machine of the character described, in combination, a plurality of weighing units, each including a scale, means for depositing the material to be weighed upon the scale, means for discharging the weighed material therefrom, means for moving a plurality of packages into position to receive the weighed loads, including an intermittently moved conveyor to present a package in position to receive the weighed load from each unit while the loads are being weighed, a one revolution clutch, and connections between the clutch and package moving means arranged to restart the operation of the weighing units when one package for each weighing unit has been moved into position.

47. In a machine of the character described, in combination, a weighing unit including a scale, means for depositing the material thereon, and means for discharging the weighed material from the scale, means for moving successive packages into a position to receive the weighed loads, a one revolution clutch controlling the operation of the weighing unit, connections between the clutch and package moving means for restarting the weighing unit when a package has been moved into receiving position, and means for stopping the package moving means in the event that the scale fails to complete its weight before the time for the package moving means to restart the weighing unit.

48. In a machine of the character described, in combination, a weighing unit, including a scale, means for delivering material upon and discharging it from the scale, means for moving successive packages to a position to receive the weighed load, and means for stopping both the movement of the packages and the operation of the weighing unit in the event of failure of the scale to complete its weight before the time for the material to be discharged from the scale.

49. In a machine of the character described, in combination, a plurality of weighing units, each including a scale, and means for depositing the material upon and discharging it from the scale, means for moving a plurality of packages, one for each unit, into position to receive the weighed loads, and means for stopping both movement of the packages and all of the weighing units in the event of failure by any of the scales to complete its weight before the material is discharged from the scale.

50. In a machine of the character described, in combination a plurality of weighing units, each including a scale, and means for depositing the material upon and discharging it from the scale, means for moving a plurality of packages, one for each unit, into position to receive the weighed loads, a one revolution clutch controlling the operation of all of the weighing units, and itself controlled by said package moving means, and means for stopping movement of the packages and thereby all of the weighing units in the event of failure by any of the scales to complete its weight before the time for discharging the material from the scale.

51. In a weighing machine, in combination, a stationary frame, a scale beam pivotally mounted on the frame to be capable of vertical movement only, a chamber above the scale for measuring an approximate load, a main supply conduit connected with said chamber, a finished weight conduit fed from the main supply conduit, means for cutting off the flow of material from the main supply conduit into said chamber, means for discharging the measured load, means for starting the stream from the finished weight conduit, and means for flowing the material into the measuring chamber while the final weight is being made.

52. In a weighing machine, in combination, a scale a conduit for delivering material upon the scale, and means for producing vibration of different extent at two different points along the length of the conduit.

53. In a weighing machine, in combination, a main frame, a scale, mechanism for feeding material to be weighed upon the scale, mechanism for discharging the weighed material from the scale, a supporting member against which the scale beam bears to support the weight during the weighing operation, and means for mounting said supporting member apart from the main frame whereby the transmission of vibration from the frame to said member is reduced to a minimum.

STANLEY R. HOWARD.